(12) United States Patent
Dubovik et al.

(10) Patent No.: US 9,734,488 B2
(45) Date of Patent: Aug. 15, 2017

(54) COMMUNICATING PER-RECIPIENT DELIVERY STATUSES OF MULTI-RECIPIENT MESSAGES IN MULTILINE SIMPLE MAIL TRANSFER PROTOCOL RESPONSES

(75) Inventors: Alex Dubovik, Bellevue, WA (US); Gregory Gourevitch, Redmond, WA (US); Yehia Ali Zayour, Redmond, WA (US); Wilbert De Graaf, Bellevue, WA (US); Vikram Kakumani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 13/431,953

(22) Filed: Mar. 27, 2012

(65) Prior Publication Data
US 2013/0262589 A1 Oct. 3, 2013

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 51/34* (2013.01)

(58) Field of Classification Search
CPC ........ H04L 12/58; H04L 51/34; G06Q 10/107
USPC .......................... 709/206, 207, 708, 709, 710
See application file for complete search history.

(56) References Cited

U.S. PATENT DOCUMENTS

| | | | |
|---|---|---|---|
| 6,438,583 B1 * | 8/2002 | McDowell | G06Q 10/107 709/206 |
| 6,782,414 B1 * | 8/2004 | Xue et al. | 709/206 |
| 7,093,025 B1 * | 8/2006 | Gupta | H04L 51/14 709/204 |
| 7,660,989 B2 | 2/2010 | Tomkow | |
| 8,458,261 B1 * | 6/2013 | Liao | H04L 51/30 709/206 |
| 2005/0120085 A1 * | 6/2005 | Ito et al. | 709/206 |
| 2006/0112165 A9 * | 5/2006 | Tomkow et al. | 709/206 |
| 2006/0168017 A1 | 7/2006 | Stern et al. | |
| 2007/0214219 A1 * | 9/2007 | Chen | 709/206 |
| 2008/0263161 A1 | 10/2008 | Jang et al. | |
| 2011/0122882 A1 | 5/2011 | Wang | |
| 2012/0158867 A1 * | 6/2012 | Levow | H04L 51/30 709/206 |
| 2013/0007176 A1 * | 1/2013 | Zakharoff | H04L 12/6418 709/206 |

OTHER PUBLICATIONS

Moore, K., "Simple Mail Transfer Protocol (SMTP) Service Extension for Delivery Status Notifications (DSNs)", Retrieved at <<http://svn.tools.ietf.org/pdf/rfc3461.pdf>>, Jan. 2003, pp. 1-39.

* cited by examiner

*Primary Examiner* — Abdelnabi O Musa
(74) *Attorney, Agent, or Firm* — Lee & Hayes, PLLC (57) ABSTRACT

A simple mail transfer protocol ("SMTP") computer fails to deliver a multi-recipient e-mail to another SMTP computer. The SMTP computer generates a multi-line SMTP response including a per-recipient delivery status for each recipient of the multi-recipient e-mail message. The multi-line SMTP response may include a line for each recipient of the e-mail message. The multi-line SMTP response alternatively may include a line only for recipients for which delivery of the e-mail message has failed.

20 Claims, 6 Drawing Sheets

FIG. 5

COMMUNICATING PER-RECIPIENT DELIVERY STATUSES OF MULTI-RECIPIENT MESSAGES IN MULTILINE SIMPLE MAIL TRANSFER PROTOCOL RESPONSES

BACKGROUND

Simple mail transfer protocol ("SMTP") is used for e-mail communications between computers. Typical e-mail systems include one or more mail transfer agents ("MTAs") and one or more mail delivery agents ("MDAs"). SMTP messages are passed through one or more MTAs to an MDA for final delivery processing. Each MTA communicates processing results back to the previous MTA in the chain of communication for post-processing.

E-mail messages may have more than one recipient. MTAs and MDAs process each recipient separately and processing results may vary for different recipients of the same message. MTAs issue one or more RCPT TO commands and receive responses for each command. RCPT TO responses can be used to communicate early per-recipient processing status, but most of the processing, such as committing to mailbox storage, is done after message data is received, which occurs later in SMTP communication.

It is with respect to these and other considerations that the disclosure made herein is presented.

SUMMARY

Concepts and technologies are described herein for communicating a per-recipient delivery status of a multi-recipient e-mail message in a multi-line SMTP response. In accordance with the concepts and technologies disclosed herein, if an SMTP computer fails to deliver a multi-recipient e-mail to a next hop, the SMTP computer generates a multi-line SMTP response including a per-recipient delivery status for each recipient of the multi-recipient e-mail message. In some embodiments, the multi-line SMTP response includes a line for each recipient of the e-mail message. In other embodiments, the multi-line SMTP response includes a line only for recipients for which delivery of the e-mail message has failed.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for communicating a per-recipient delivery status of a multi-recipient e-mail message in a multi-line SMTP response. According to one aspect of the concepts and technologies described herein, if an SMTP computer fails to deliver a multi-recipient e-mail to a next hop, the SMTP computer generates a multi-line SMTP response including a per-recipient delivery status for each recipient of the multi-recipient e-mail message. In some embodiments, the multi-line SMTP response includes a line for each recipient of the e-mail message. In other embodiments, the multi-line SMTP response includes a line only for recipients for which delivery of the e-mail message has failed.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for communicating a per-recipient delivery status of a multi-recipient e-mail message in a multi-line SMTP response will be presented.

Figure 1:
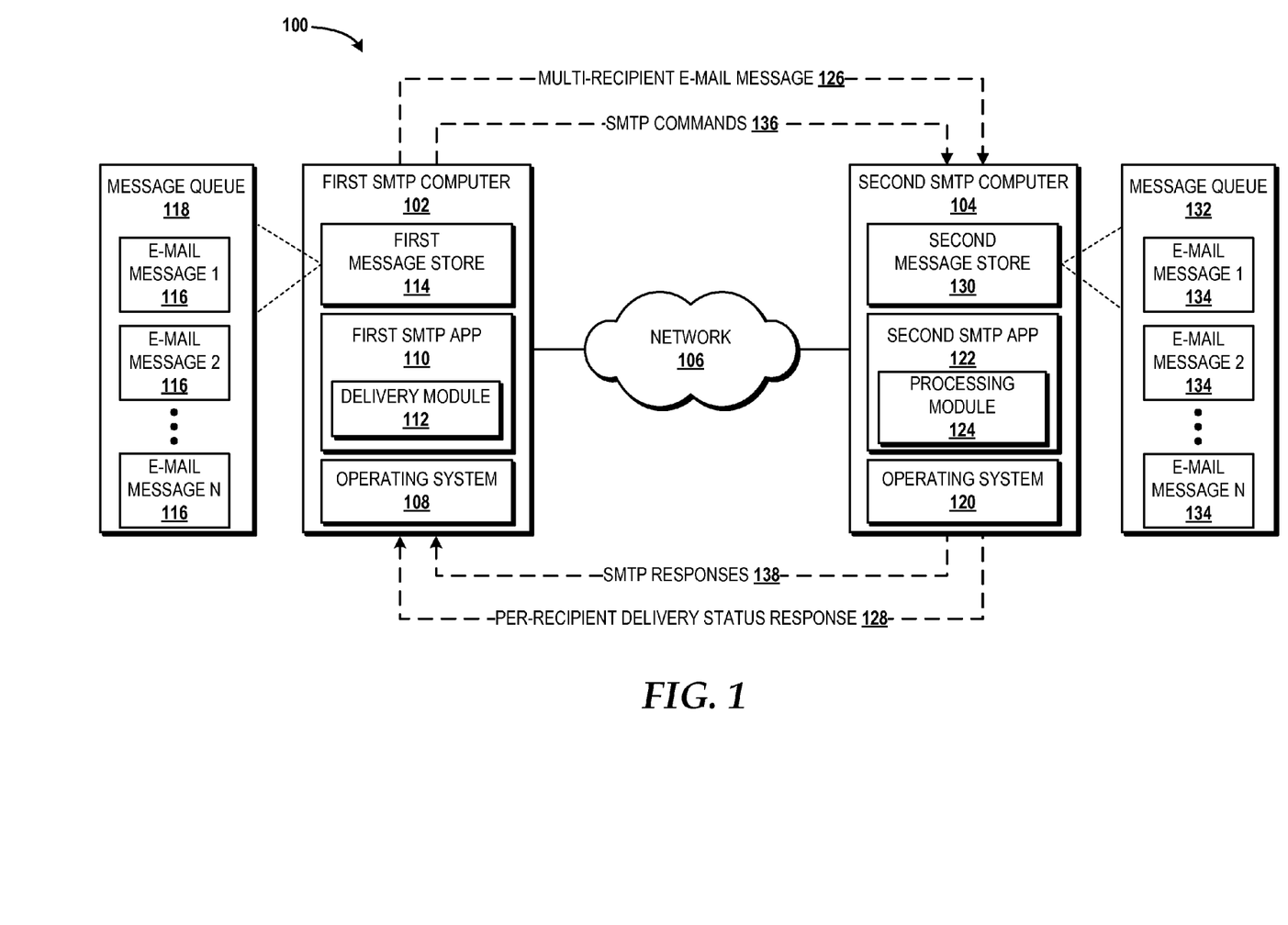
FIG. 1 is a system diagram illustrating an illustrative operating environment for implementing various embodiments presented herein.

Referring now to FIG. 1, aspects of one operating environment 100 for various embodiments presented herein will be described. The illustrated operating environment 100 includes a first SMTP computer 102 that is in communication with a second SMTP computer 104 via a network 106 to exchange e-mail messages during an SMTP session. The first SMTP computer 102 and the second SMTP computer 104 each may be a personal computer ("PC"), a desktop workstation, a laptop computer, a tablet computer, a notebook computer, an ultraportable computer, a personal digital assistant ("PDA"), an electronic-book reader, a mobile telephone, a game console, a set-top box, a consumer electronics device, a server computer, or any other type of computing system configured to perform the various operations described herein for communicating a per-recipient delivery status of a multi-recipient e-mail message in a multi-line SMTP response. The network 106 may be an internet, the Internet, a local area network ("LAN"), a campus area network ("CAN"), a metropolitan network ("MAN"), or a wide area network ("WAN"). Moreover, although only a single network is illustrated, it is contemplated that the first SMTP computer 102 and/or the second SMTP computer 104 may be in communication with another network, which facilitates a connection to the network 106.

The first SMTP computer 102 is configured to execute a first operating system 108 and one or more application programs such as, in the illustrated embodiment, a first SMTP application 110. The first operating system 108 is a computer program for controlling the operation of the first SMTP computer 102. The first SMTP application 110 is an executable program configured to execute on top of the first operating system 108 to provide functionality to the first SMTP computer 102 to deliver e-mail messages to the second SMTP computer 104. In some embodiments, the first SMTP application 110 is a mail transfer agent ("MTA") configured to accept e-mail messages received from another MTA (not shown) or a mail user agent ("MUA"), such as MICROSOFT OUTLOOK, available from Microsoft Corporation of Redmond, Wash., or a web-based e-mail application (also not shown), and transfer the e-mail messages to the second SMTP computer 104. In these embodiments, the second SMTP computer 104 may function as or include an MTA or a mail delivery agent ("MDA"). In some embodiments, the first SMTP application 110 operates as or includes an MTA for MICROSOFT EXCHANGE, available from Microsoft Corporation of Redmond, Wash. The first SMTP application 110 is configured to utilize SMTP and ESMTP.

The first SMTP computer 102 includes a delivery module 112 of the first SMTP application 110 and a first message store 114. The delivery module 112 is a program module of the first SMTP application 110 that is configured to retrieve one or more e-mail messages 116 from a message queue 118 within the first message store 114, perform pre-processing operations on the e-mail messages, and to send the e-mail messages 116 to the second SMTP computer 104. In some embodiments, an e-mail message stored in the first message store 114 of the first SMTP computer 102 originates at the first SMTP computer 102. In other embodiments, an e-mail message stored in the first message store 114 of the first SMTP computer 104 is received by the first SMTP computer 102 from another computer operating as or including an MTA, which may or may not have received the e-mail message from yet another computer operating as or including an MTA.

The second SMTP computer 104 is configured to execute a second operating system 120 and one or more application programs such as, in the illustrated embodiment, a second SMTP application 122. The second operating system 120 is a computer program for controlling the operation of the second SMTP computer 104. The second SMTP application 122 is an executable program configured to execute on top of the second operating system 120 to provide various functionality described herein. In some embodiments, the second SMTP application 122 is an MTA configured to receive the e-mail messages 116 from the first SMTP computer 102. The second SMTP application 122 is configured to utilize SMTP and ESMTP.

The second SMTP computer 104 includes a processing module 124 of the second SMTP application 122. The processing module 124 is a program module of the second SMTP application 122 that is configured to receive and process a multi-recipient e-mail message 126, such as one of the e-mail messages 116, received from the first SMTP computer 102, and to determine if delivery fails for one or more of the recipients of the multi-recipient e-mail message 126. Delivery of the multi-recipient e-mail message 126 to a recipient may fail for various reasons including, but not limited to, a recipient mailbox is full error message, the recipient could not be resolved, the recipient thread limit has been exceeded, the mailbox server thread limit has been exceeded, the mailbox server is offline, and a delivery exception.

If processing fails for one or more of the recipients of the multi-recipient e-mail message 126, the processing module 124 generates a per-recipient delivery status response 128 including a delivery status for each recipient identified for the multi-recipient e-mail message 126 and sends the per-recipient delivery status response 128 to the first SMTP computer 102. The first SMTP computer 102 and, more particularly, the first SMTP application 110, receives the per-recipient delivery status response 128 and updates the message queue 118 based upon the per-recipient status received in the multi-line SMTP response.

In some embodiments, the per-recipient delivery status response 128 utilizes the following response structure:

```
< Status Code>-<Enhanced Status Code> <MessageText>
< Status Code>-<RecipientStatus 1>
< Status Code>-<RecipientStatus 2>
    .
    .
    .
< Status Code> <RecipientStatus N>.
```

In these embodiments, the first line contains a mailitem scoped response, which is a standard first line of a multi-line SMTP response with optional message scoped parameter(s). The subsequent lines contain per-recipient responses and any optional parameters. It should be understood that the implementation of <RecipientStatus> may vary, and may contain a standard SMTP response structure for a given recipient. <StatusCode> may be the same for all lines in a given per-recipient delivery status response. An example per-recipient delivery status response that adheres to the above response structure is illustrated and described herein below with reference to FIG. 4.

In some embodiments, the response lines for one or more recipients contain control information that the sending MTA (e.g., the first SMTP computer 102) can use in message and recipient processing, as will be described in greater detail below with reference to FIG. 2. Message scoped parameter(s) may be supplied in the first line and subsequent lines may contain parameters that are relevant to specific recipients. It should be understood that the format and structure of parameter may vary for different implementations. The following is an example response structure of a per-recipient delivery status response that includes control information:

```
< Status Code>-< Status Code>-<Enhanced Status Code> <MessageText>
[<Parameter1Name>=<Parameter1Value>]
< Status Code>-< Recipient1 Status Code>-<Recipient1 Enhanced Status
```

-continued

```
Code> <Recipient1 MessageText> [<Paramr1Name>=<Param1Value>]
< Status Code>-< Recipient2 Status Code>-<Recipient2 Enhanced Status
Code> <
Recipient2 MessageText> [<Param2Name>=<Param2Value>]
.
.
.
< Status Code> < Recipient N Status Code>-<Recipient N Enhanced
Status Code> <Recipient N MessageText>
[<ParamNName>=<Param NValue>]
```

In this example, an optional mailitem and per-recipient scoped parameters, such as control information, are enclosed in the square brackets. Control information may include, but is not limited to, a delivery retry interval and a reroute condition indicating whether or not the multi-recipient e-mail message 126 should be rerouted. Example per-recipient delivery status responses that adhere to the above response structure are described herein below with reference to FIGS. 3A and 3B.

In some embodiments, the per-recipient delivery status response 128 comprises a count and an order of recipients that matches a count and an order of recipients as identified in the RCPT TO commands. This allows both the first SMTP computer 102 and the second SMTP computer 104 to relate per-recipient delivery statuses to recipient e-mail address without adding additional parameters. Alternatively, per-recipient response parameters can be added to uniquely identify each recipient. The per-recipient response parameters may be, but are not limited to, e-mail addresses. This allows the per-recipient delivery status response 128 to include the recipients in an order other than the count and the order as identified in the RCPT TO commands.

The second SMTP computer 104 also includes a second message store 130. The second message store 130 includes a message queue 132 for e-mail messages 134 received by the second SMTP computer 104. One or more of the e-mail messages 134 may be delivered to another SMTP computer (not shown) that is operating as an MTA. Alternatively, if the second SMTP computer 104 is operating as or includes an MDA, one or more of the e-mail messages 134 may be delivered to recipient mailboxes.

The first SMTP computer 102 is configured to generate SMTP commands 136 and send the SMTP commands 136 to the second SMTP computer 104 to, at least in part, establish an SMTP session and to transfer the multi-recipient e-mail message 126 to the second SMTP computer 104 during the SMTP session. The multi-recipient e-mail message 126 is sent as part of the SMTP commands 136. The second SMTP computer 104 is configured to generate SMTP responses 138 and send the SMTP responses 138 to the first SMTP computer 102 to, at least in part, establish the SMTP session, to acknowledge success or failure of the SMTP commands 136, and to provide to the first SMTP computer 102 the per-recipient delivery status response 128 including a delivery status for each recipient of the multi-recipient e-mail message 126 in response to a delivery failure to one or more of the recipients of the multi-recipient mail message 126, as will now be described in greater detail with reference to FIG. 2.

Figure 2:
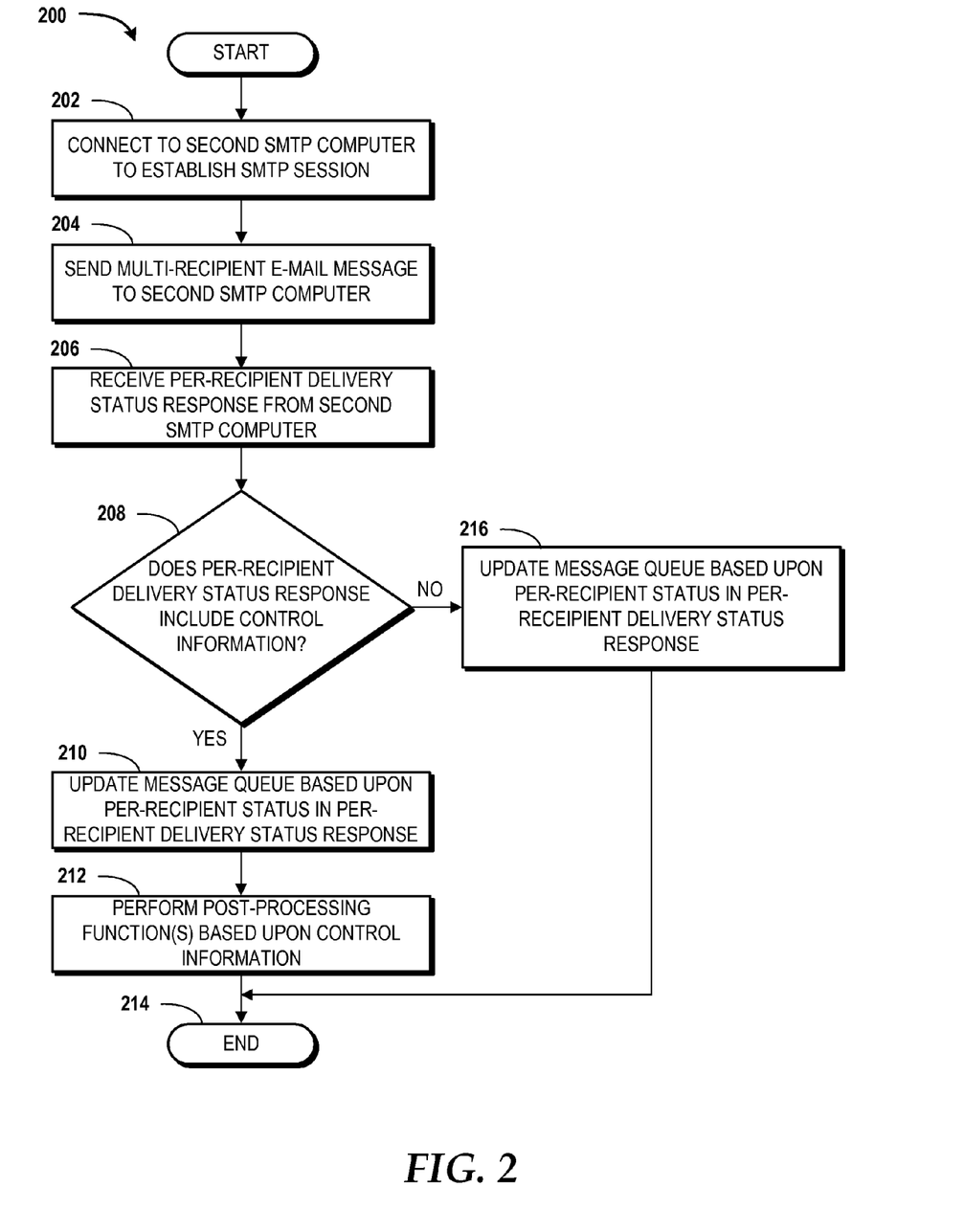
FIG. 2 is a flow diagram showing aspects of a method for processing a per-recipient delivery status of a multi-recipient e-mail message received in a multi-line SMTP response, according to an illustrative embodiment.

Turning now to FIG. 2, aspects of a method 200 for processing a per-recipient delivery status of a multi-recipient e-mail message received in a multi-line SMTP response will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the methods disclosed herein are described as being performed by the first SMTP computer 102 and the second SMTP computer 104 and, more particularly, the first SMTP application 110 executing on the first SMTP computer 102 and the second SMTP application 122 executing on the second SMTP computer 104. It should be understood that these embodiments are illustrative, and should not be viewed as being limiting in any way. The method 200 is now described with reference to FIGS. 1 and 2.

The method 200 begins and proceeds to operation 202, wherein the first SMTP computer 102 connects to the second SMTP computer 104 to establish an SMTP session. From operation 202, the method 200 proceeds to operation 204, wherein the first SMTP computer 102 sends the multi-recipient e-mail message 126 to the second SMTP computer 104. From operation 204, the method 200 proceeds to operation 206, wherein the first SMTP computer 102 receives the per-recipient delivery status response 128 from the second SMTP computer 104. Although not illustrated, the first SMTP computer 102 may alternatively receive a single line delivery status response, for example, if the second SMTP computer 104 fails to deliver the multi-recipient e-mail message 126 to all of the recipients, or if the second SMTP computer 104 successfully delivers the multi-recipient e-mail message 126 to all of the recipients. This and other implementations of delivery status responses are described in greater detail below with reference to FIGS. 3A and 3B.

From operation 206, the method 200 proceeds to operation 208, wherein the first SMTP computer 102 determines if the per-recipient delivery status response 128 includes control information. If the first SMTP computer 102 determines, at operation 208, that the per-recipient delivery status response 128 includes control information, the method 200 proceeds to operation 210. At operation 210, the first SMTP computer 102 updates the message queue 118 based upon per-recipient status information included in the per-recipient delivery status response 128. The method 200 then proceeds to operation 212, wherein the first SMTP computer 102 performs one or more post-processing functions based upon the control information. For instance, the first SMTP computer 102 may wait a specified time period and then retry delivering the multi-recipient e-mail message 126 to the second SMTP computer 104. Alternatively, the first SMTP computer 102 may reroute the multi-recipient e-mail message 126 to another SMTP computer (not shown). It is contemplated that the control information may include instructions for the first SMTP computer 102 to perform other functions that are not explicitly disclosed herein. The method 200 then proceeds to operation 214. The method 200 ends at operation 214.

If the first SMTP computer 102 determines, at operation 208, that the per-recipient delivery status response 128 does not include control information, the method 200 proceeds to operation 216. At operation 216, the first SMTP computer 102 updates the message queue 118 based upon per-recipient status information included in the multi-line status response. The method 200 then proceeds to operation 214, wherein the method 200 ends.

Figure 3A:
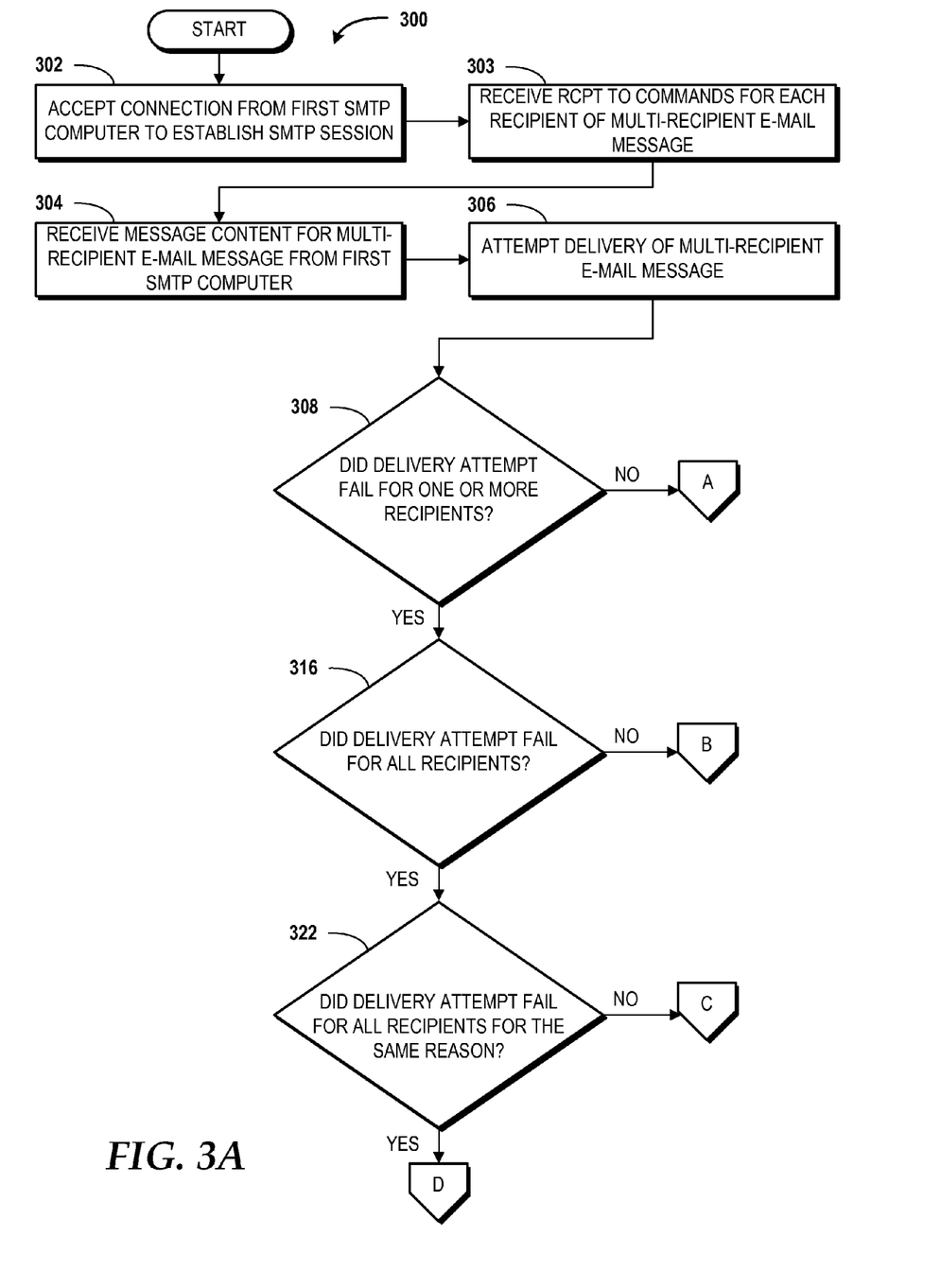
FIGS. 3A and 3B are flow diagrams showing aspects of a method for communicating a per-recipient delivery status of a multi-recipient e-mail message in a multi-line SMTP response, according to an illustrative embodiment.
Figure 3B:
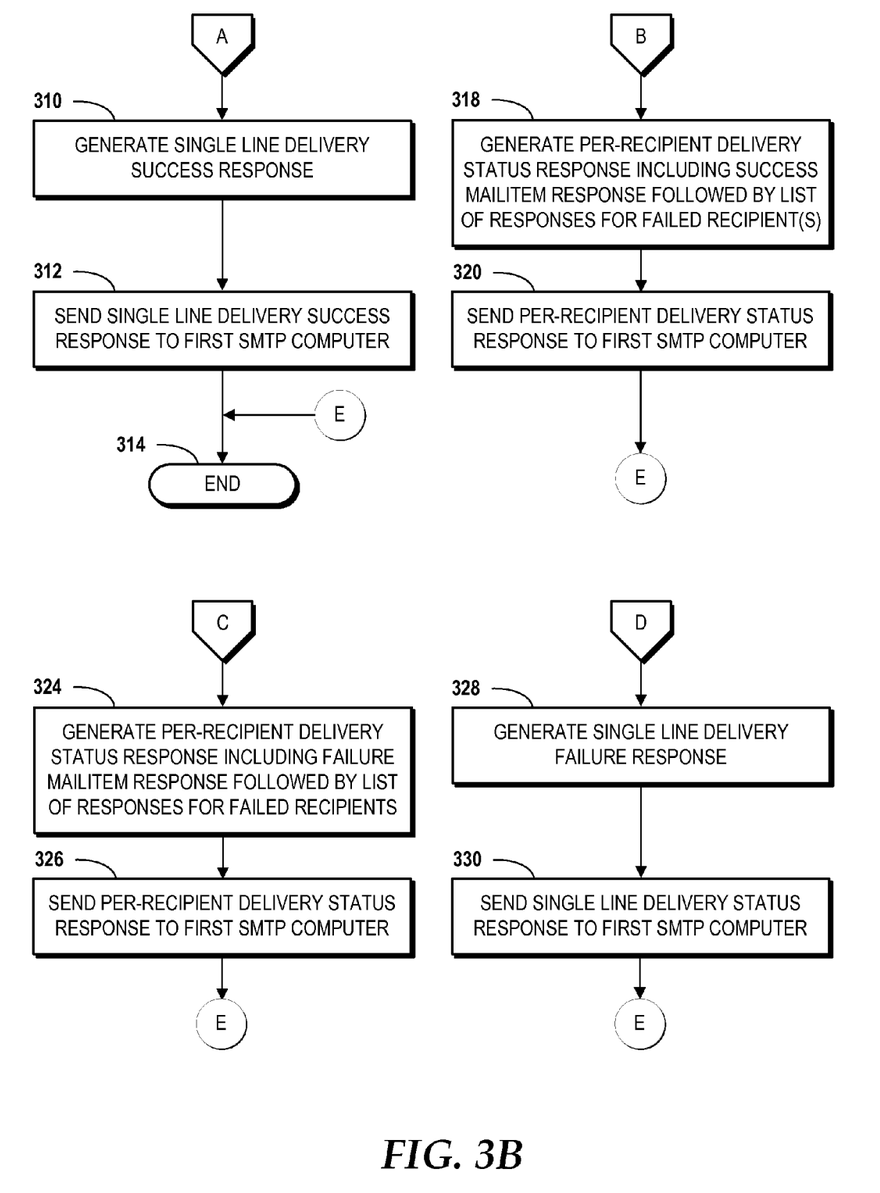

FIGS. 3A and 3B are flow diagrams showing aspects of a method 300 for communicating a per-recipient delivery status of a multi-recipient e-mail message in a multi-line SMTP response will be described in detail. Turning first to FIG. 3A, the method 300 begins and proceeds to operation 302, wherein the second SMTP computer 104 accepts a connection from the first SMTP computer 102 to establish an SMTP session, for example, in response to the first SMTP computer 102 sending a HELO SMTP command or an EHLO ESMTP command to the second SMTP computer 104 and the second SMTP computer 104 acknowledging successful receipt of the command. In any case, the method 300 then proceeds to operation 303, wherein the second SMTP computer 104 receives RCPT TO commands for each recipient of the multi-recipient e-mail message 126. The RCPT commands each identify a recipient of the multi-recipient e-mail message 126.

From operation 303, the method 300 proceeds to 304, wherein the second SMTP computer 104 receives message content for the multi-recipient e-mail message 126 from the first SMTP computer 102. For instance, the second SMTP computer 104 may receive a DATA or BDAT command, acknowledge receipt of the DATA or BDAT command, and then receive the message content for the multi-recipient e-mail message 126. From operation 304, the method 300 proceeds to operation 306, wherein the second SMTP computer 104 attempts to deliver of the multi-recipient e-mail message 126 to the recipients identified for the multi-recipient e-mail message 126 in the RCPT TO commands received at operation 303.

From operation 306, the method 300 proceeds to operation 308, wherein the second SMTP computer 104 determines if the delivery attempt failed for one or more of the recipients. If, at operation 308, the second SMTP computer 104 determines that the delivery attempt did not fail for one or more of the recipients, the method 300 proceeds to operation 310, illustrated in FIG. 3B. At operation 310, the second SMTP computer 104 generates a single line delivery success response including an indication that delivery of the multi-recipient e-mail message 126 was successful for all of the recipients. For instance, the single line delivery success response may include an SMTP "250" status code response indicating the successful delivery of the multi-recipient e-mail message 126 to all of the recipients identified for the multi-recipient e-mail message 126. The method 300 then proceeds to operation 312, wherein the second SMTP computer 104 sends the single line delivery success response to the first SMTP computer 102. From operation 312, the method 300 proceeds to operation 314, wherein the method 300 ends.

Turning back to FIG. 3A, if, at operation 308, the second SMTP computer 104 determines that the delivery attempt did fail for one or more recipients, the method 300 proceeds to operation 316, wherein the second SMTP computer 104 determines if the delivery attempt failed for all of the recipients. If, at operation 316, the second SMTP computer 104 determines that the delivery attempt did not fail for all of the recipients, the method 300 proceeds to operation 318, illustrated in FIG. 3B. This scenario is referred to herein as a partial delivery success. At operation 318, the second SMTP computer 104 generates the per-recipient delivery status response 128 including a success mailitem response followed by a list of responses for the failed recipient(s). For instance, the per-recipient delivery status response 128 for a partial delivery success scenario may include an SMTP "250" status code response for each recipient to which the multi-recipient e-mail message 126 was successfully delivered and an SMTP failure status code response for each recipient to which the multi-recipient e-mail message 126 was not successfully delivered. The SMTP failure status code is used to identify a failure state of some operation of the second SMTP computer 104 that has prevented successful delivery of the multi-recipient e-mail message 126 to one or more of the recipients, such as, but not limited to, an SMTP "432" failure status code or an SMTP "532" failure status code. The method 300 then proceeds to operation 320, wherein the second SMTP computer 104 sends the per-recipient delivery status response 128 to the first SMTP computer 102. From operation 320, the method 300 proceeds to operation 314, wherein the method 300 ends.

Turning back to FIG. 3A, if, at operation 316, the second SMTP computer 104 determines that the delivery attempt did fail for all of the recipients, the method 300 proceeds to operation 322. At operation 322, the second SMTP computer 104 determines if the delivery attempt failed for all of the recipients for the same reason. If, at operation 322, the second SMTP computer 104 determines that the delivery attempt did not fail for all of the recipients for the same reason, the method 300 proceeds to operation 324, illustrated in FIG. 3B. At operation 324, the second SMTP computer 104 generates the per-recipient delivery status response 128 including a failure mailitem response followed by a list of responses for the failed recipients. For instance, the per-recipient delivery status response 128 for this scenario may include an SMTP failure status code response indicating a failure state of some operation of the second SMTP computer 104 that has prevented successful deliver of the multi-recipient e-mail message 126 for each of the recipients identified for the multi-recipient e-mail message 126. The method 300 then proceeds to operation 326, wherein the second SMTP computer 104 sends the per-recipient delivery status response 128 to the first SMTP computer 102. From operation 326, the method 300 proceeds to operation 314, wherein the method 300 ends.

Turning back to FIG. 3A, if, at operation 322, the second SMTP computer 104 determines that the delivery attempt did fail for all of the recipients for the same reason, the method 300 proceeds to operation 328, illustrated in FIG. 3B. At operation 328, the second SMTP computer 104 generates a single line delivery failure response including an indication that delivery of the multi-recipient e-mail message 126 failed for all of the recipients. For instance, the single line delivery failure response may include an SMTP failure status code response indicating a failure state of some operation of the second SMTP computer 104 that has prevented successful delivery of the multi-recipient e-mail message 126 to all of the recipients, such as, but not limited to, an SMTP "432" failure status code or an SMTP "532" failure status code. The method 300 then proceeds to operation 330, wherein the second SMTP computer 104 sends the single line delivery failure response to the first SMTP computer 102. From operation 330, the method 300 proceeds to operation 314, wherein the method 300 ends.

In some embodiments, at operation 310, the second SMTP computer 104 alternatively generates per-recipient delivery success responses and then, at operation 312, sends the per-recipient delivery success responses to the first SMTP computer 102. In some embodiments, at operation 328, the second SMTP computer 104 alternatively generates per-recipient delivery failure responses and then, at operation 330, sends the per-recipient delivery failure responses to the first SMTP computer 102. In some embodiments, at operation 318, the second SMTP computer 104 includes per-recipient delivery success responses in the list of responses for the recipients for which delivery of the multi-recipient e-mail message 126 was successful.

Figure 4:
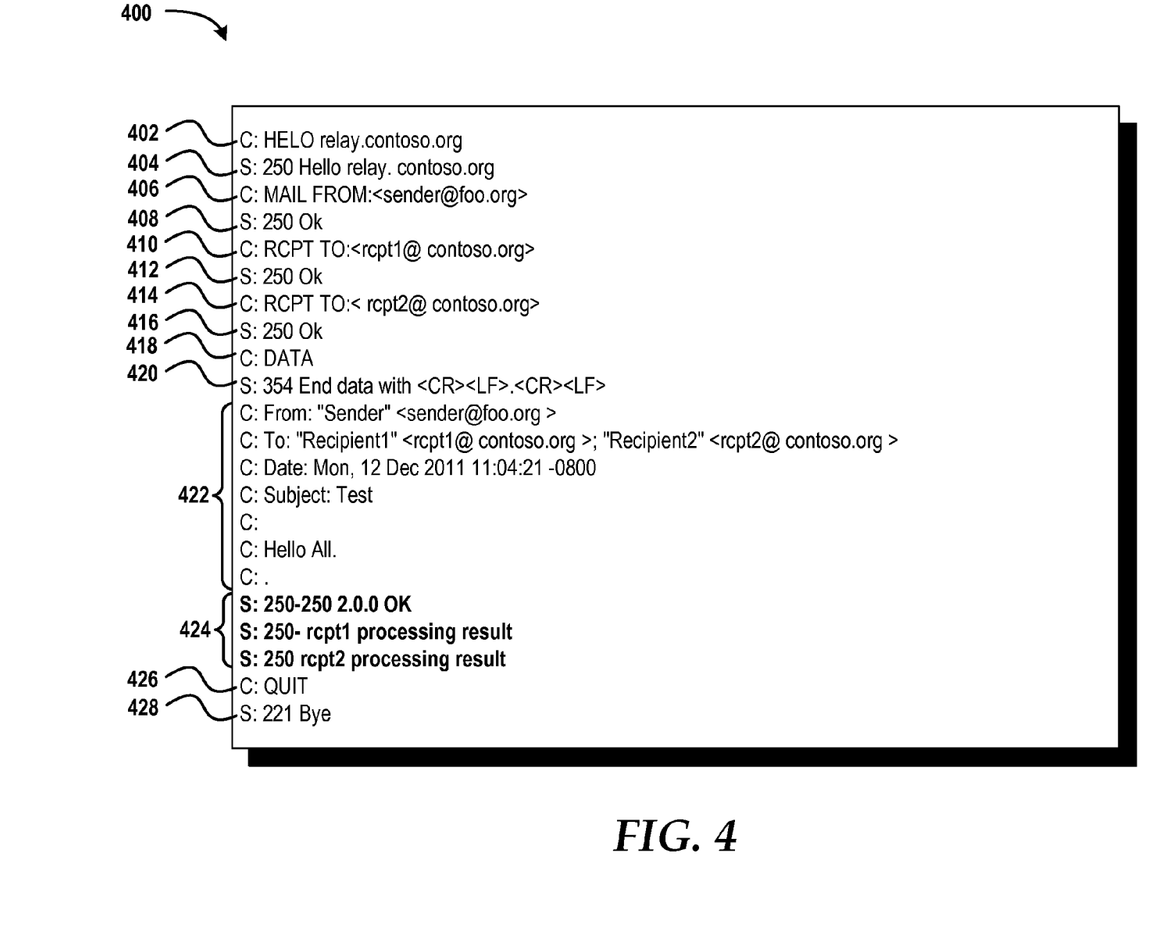
FIG. 4 is a diagram illustrating an SMTP session during which a multi-line SMTP response including a per-recipient delivery status of a multi-recipient e-mail message is exchanged, according to an illustrative embodiment.

Turning now to FIG. 4, a diagram illustrating an illustrative SMTP session 400 will be described in detail. It should be understood that the SMTP session 400 may utilize ESMTP commands in addition to SMTP commands. The SMTP session 400 is a simplified SMTP session used for purposes of illustrating and describing an illustrative SMTP command flow between computer systems operating as a client ("C"), such as the first SMTP computer 102, and a server ("S"), such as the second SMTP computer 104, in accordance with the aspects disclosed herein.

The SMTP session 400 begins when the first SMTP computer 102 sends a HELO command 402 to identify itself to the second SMTP computer 104 and to establish the SMTP session 400 with the second SMTP computer 104. The second SMTP computer 104 responds with an SMTP "250" status code response 404 indicating successful receipt of the HELO command 402. The first SMTP computer 102 then sends a MAIL command 406 to identify the start of a message transfer by identifying the sender of the message. In the illustrated example, the sender is identified as sender@foo.org. In response, the second SMTP computer 104 sends an SMTP "250" status code response 408 indicating successful receipt of the MAIL command 406.

The first SMTP computer 102 then sends a first RCPT command 410 to identify a first message recipient of the message. In the illustrated example, the first recipient is rcpt1@contoso.org. The second SMTP computer 104 acknowledges successful receipt of the first RCPT command 410 with an SMTP "250" status code response 412. The first SMTP computer 102 then sends a second RCPT command 414 to identify a second message recipient of the message. In the illustrated example, the second recipient is rcpt2@contoso.org. The second SMTP computer 104 acknowledges successful receipt of the second RCPT command 410 with an SMTP "250" status code response 416.

After the first SMTP computer 102 has established the SMTP session 400 and identified the sender and recipients of the message to the second SMTP computer 104, the first SMTP computer 102 sends a DATA command 418 to the second SMTP computer 102 to initiate transfer of message content of the message. The second SMTP computer 104 responds with an SMTP "354" status code response 420 to indicate that it is ready to accept the message content of the message from the first SMTP computer 102. The first SMTP computer 102 then responds with message content 422.

In response to receiving the message content 422, the second SMTP computer 104 processes the message and returns a per-recipient delivery status response 424. In the illustrated example, the per-recipient delivery status response 424 follows the above example per-recipient delivery status response structure, which is also duplicated below for convenience.

```
< Status Code>-<Enhanced Status Code> <MessageText>
< Status Code>-<RecipientStatus 1>
< Status Code><RecipientStatus 2>
```

The <Status Code>, in the illustrated example, is an SMTP "250" status code for each line of the per-recipient delivery status response 424. The <Enhanced Status Code> is an SMTP "250 2.0.0" enhanced status code. The <MessageText> is "OK." The <RecipientStatus 1> is "rcpt1 processing result." The <RecipientStatus 2> is "rcpt2 processing result." If delivery of the message to the first recipient has failed, the <RecipientStatus 1> includes an indication of the failure. Likewise, if delivery of the message to the second recipient has failed, the <RecipientStatus 2> includes an indication of the failure.

In some embodiments, the <RecipientStatus 1> and/or the <RecipientStatus 2> include <Recipient1 Status Code>-<Recipient1 Enhanced Status Code> <Recipient1 MessageText>. Moreover, in these embodiments, the <RecipientStatus 1> and/or the <RecipientStatus 2> may include control information, which is used by the first SMTP computer 102 to perform one or more post-processing functions, such as described above with reference to FIG. 2. Examples of this type of recipient status have been described above in detail with reference to FIGS. 3A and 3B. In some embodiments, the <RecipientStatus 1> and/or the <RecipientStatus 2> include a status that is useable by the first SMTP computer 102 to determine whether or not delivery of the message has failed for the first recipient and the second recipient, respectively.

It should be understood that although only two recipients and, therefore, two recipient statuses are shown for the per-recipient delivery status response 424, an e-mail message may contain any number of recipients and the per-recipient delivery status response 424 may contain any number of corresponding recipient statuses. As such, the illustrated embodiment of the SMTP session 400 should not be construed as being limiting in any way.

Figure 5:
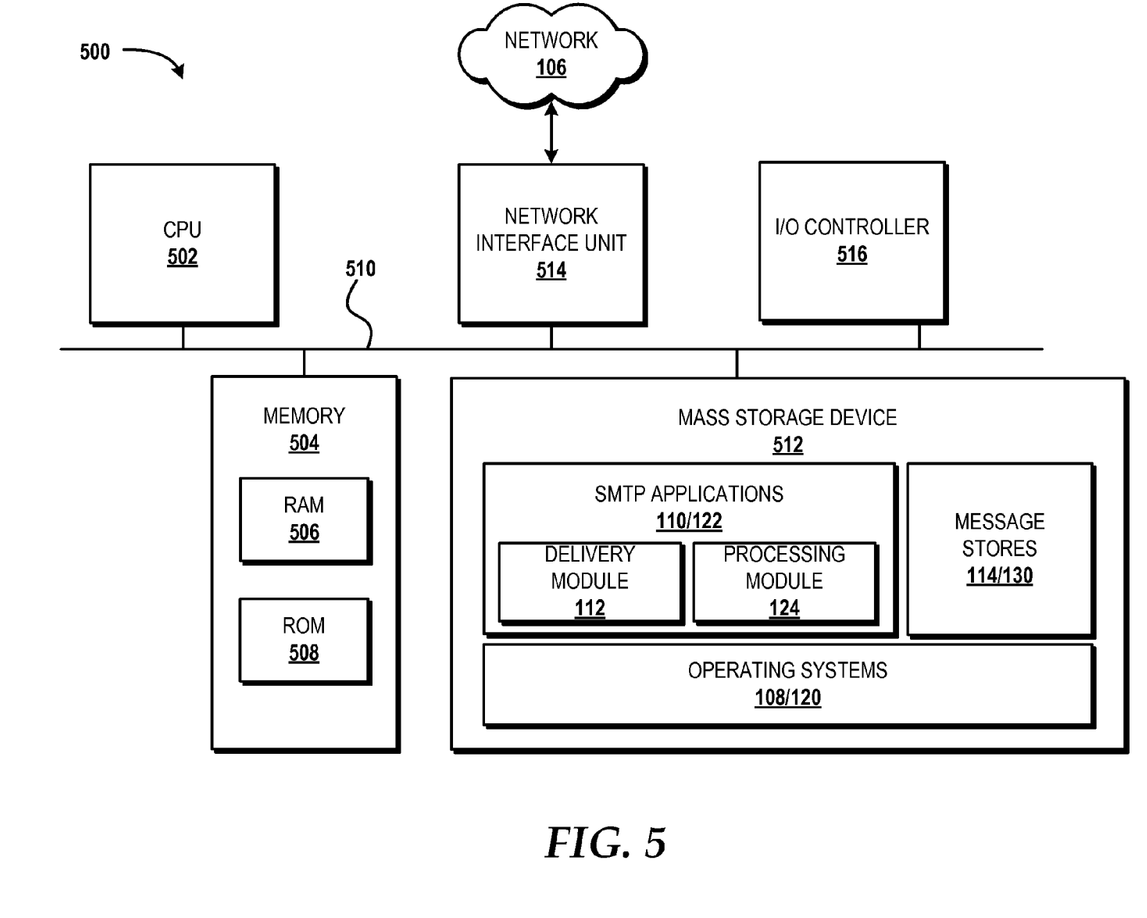
FIG. 5 is a computer architecture diagram illustrating an illustrative computer hardware and software architecture for a computing system capable of implementing aspects of the embodiments presented herein.

FIG. 5 illustrates an illustrative computer architecture 500 for communicating a per-recipient delivery status of a multi-recipient e-mail message in a multi-line SMTP response. Thus, the computer architecture 500 illustrated in FIG. 5 illustrates an architecture for a PC, a desktop workstation, a laptop computer, a tablet computer, a notebook computer, an ultraportable computer, a PDA, an electronic-book reader, a mobile telephone, a game console, a set-top box, a consumer electronics device, a server computer, or any other type of computing system configured to perform the various operations described herein for communicating a per-recipient delivery status of a multi-recipient e-mail message in a multi-line SMTP response. The computer architecture 500 may be utilized to execute any aspects of the software components presented herein.

In some embodiments, the first SMTP computer 102 and/or the second SMTP computer 104 are configured in accordance with the computer architecture 500. As such, software components of the first SMTP computer 102 and the second SMTP computer 104 are shown together within the computer architecture 500 for ease of illustration. It should be understood, however, that these software components may be and are likely to be implemented in separate computers, such as in a client/server configuration, or as standalone software components executing on one or both of the first SMTP computer 102 and the second SMTP computer 104.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the first operating system 108, the second operating system 120, the first SMTP application 110, the second SMTP application 122, the delivery module 112, the processing module 124, the first message store 114, and the second message store 130.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 106. The computer architecture 500 may connect to the network 106 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, electronic stylus, touch screen, microphone (e.g., for voice input), or other input device (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for communicating a per-recipient delivery status of a multi-recipient e-mail message in a multi-line SMTP response have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A server simple mail transfer protocol ("SMTP") computer system, comprising:
    a plurality of servers including a first server and a second server;
    the second server including a processor, the second server configured to receive and process multi-recipient e-mail messages;
    a memory in communication with the processor of the second server, the memory having computer-readable instructions stored thereupon that, when executed by the processor, configure the second server to:
        accept a connection from the first server, the connection indicating establishing a SMTP session;
        receive a multi-recipient e-mail message from a client SMTP computer system, the multi-recipient e-mail message identifying a plurality of recipients to which the multi-recipient e-mail message is to be sent;
        receive a receipt to command for each of the plurality of recipients and a message content for the multi-recipient e-mail message;
        attempt delivery of the multi-recipient e-mail message to each of the plurality of recipients;
        determine if delivery of the multi-recipient email messaged failed for each of the plurality of recipients;
        in response to determining that delivery of the multi-recipient e-mail message failed for each of the plurality of recipients, determine if delivery of the multi-recipient e-mail message failed for each of the plurality of recipients for a same reason; and
        in response to determining that delivery of the multi-recipient e-mail message failed for each of the plurality of recipients for the same reason,
            generate a single line delivery failure response indicating failed delivery of the multi-recipient e-mail message to each of the plurality of recipients, and
            send the single line delivery failure response to the client SMTP computer system.

2. The server SMTP computer system of claim 1, the single line delivery failure response including a SMTP multi-line response.

3. The server SMTP computer system of claim 1, the server SMTP computer system operates as a mail transfer agent ("MTA"), and the client SMTP computer system operates as another MTA or as a mail user agent ("MUA").

4. The server SMTP computer system of claim 1, wherein the per-recipient delivery status response further includes a control information and further comprising:
    the first server including a processor, the first server configured to receive and process multi-recipient e-mail messages; and
    a memory in communication with the processor of the first server, the memory having computer-readable instructions stored thereupon that, when executed by the processor, configure the first server to:
        receive the per-recipient delivery status response from the second server;
        update a message queue based upon the per-recipient status in the per-recipient status response; and
        perform a post-processing function based on the control information.

5. The server SMTP computer system of claim 1, wherein the single line delivery failure response includes control information comprising a reroute condition that instructs the client SMTP computer system to send the multi-recipient e-mail message to another computer in accordance with the reroute condition.

6. The server SMTP computer system of claim 1, wherein the memory comprises further computer-readable instructions that, when executed by the processor, cause the processor to perform a post-processing function comprising sending the multi-recipient e-mail message in accordance with a retry interval, wherein the control information further comprises the retry interval.

7. The server SMTP computer system of claim 1, wherein the single line delivery failure response comprises a SMTP single line response.

8. The server SMTP computer system of claim 1, wherein the same reason is at least one of a mailbox for each of the plurality of recipients is full, and a thread limit for each of the plurality of recipients has been exceeded.

9. The server SMTP computer system of claim 1, the memory comprising further computer-readable instructions that, when executed by the processor, cause the computer system to:
    in response to determining that delivery of the multi-recipient e-mail message did not fail for each of the plurality of recipients,
        generate a per-recipient delivery status response, the per-recipient delivery status response comprising a failure delivery status for at least one recipient of the plurality of recipients for which delivery of the multi-recipient e-mail message failed, and
        send the per-recipient delivery status response to the client SMTP computer system.

10. A non-transitory computer storage medium having computer-readable instructions stored thereupon that, when executed by a server simple mail transfer protocol ("SMTP") computer, configure the server SMTP computer to:

accept a connection to establish a SMTP session;

receive a multi-recipient e-mail message from a client SMTP computer, the multi-recipient e-mail message identifying a plurality of recipients to which the multi-recipient e-mail message is to be sent;

receive a receipt to command for each of the plurality of recipients and message content for the multi-recipient e-mail message;

attempt delivery of the multi-recipient e-mail message to each of the plurality of recipients;

determine if delivery of the multi-recipient e-mail message failed for each of the plurality of recipients;

in response to determining that delivery of the multi-recipient e-mail message did not fail for each of the plurality of recipients,
generate a per-recipient delivery status response, the per-recipient delivery status response comprising a failure delivery status for at least one recipient of the plurality of recipients for which delivery of the multi-recipient e-mail message failed, and
send the per-recipient delivery status response to the client SMTP computer system;

in response to determining that delivery of the multi-recipient e-mail message failed for each of the plurality of recipients, determine if delivery of the multi-recipient e-mail message failed for each of the plurality of recipients for a same reason; and in response to determining that delivery of the multi-recipient e-mail message failed for each of the plurality of recipients for the same reason,
generate a single line delivery failure response indicating failed delivery of the multi-recipient e-mail message to each of the plurality of recipients, and
send the single line delivery failure response to the client SMTP computer.

11. The computer storage medium of claim 10, wherein the per-recipient delivery status response further comprises control information including at least a reroute condition.

12. The computer storage medium of claim 11, further comprising computer-executable instructions that cause the server SMTP computer to perform a post-processing function comprising sending the multi-recipient e-mail message to another computer in accordance with the reroute condition.

13. The computer storage medium of claim 10, wherein the same reason comprises at least one of a mailbox for each of the plurality of recipients is full and a thread limit for each of the plurality of recipients has been exceeded.

14. The computer storage medium of claim 10, wherein the same reason comprises a thread limit for each of the plurality of recipients has been exceeded.

15. A computer-implemented method for processing a single line delivery status response, the computer-implemented method comprising performing computer-implemented operations for:

accepting a connection to establish a SMTP session;

receiving a multi-recipient e-mail message from a client SMTP computer, the multi-recipient e-mail message identifying a plurality of recipients to which the multi-recipient e-mail message is to be sent;

receiving a receipt to command for each of the plurality of recipients and a message content for the multi-recipient e-mail message;

attempting delivery of the multi-recipient e-mail message to each of the plurality of recipients;

determining that delivery of the multi-recipient e-mail message failed for each of the plurality of recipients for a same reason; and in response to determining that delivery of the multi-recipient e-mail message failed for each of the plurality of recipients for the same reason,
generating a single line delivery failure response indicating failed delivery of the multi-recipient e-mail message to each of the plurality of recipients, and
sending the single line delivery failure response to the client SMTP computer.

16. The computer-implemented method of claim 15, further comprising updating a message queue stored in a message store of the client SMTP computer based upon the single line delivery status response.

17. The computer-implemented method of claim 15, wherein the same reason comprises mailbox for each of the plurality of recipients is full.

18. The computer-implemented method of claim 15, wherein the single line delivery failure response includes control information comprising a reroute condition and performing the post-processing function comprises sending the multi-recipient e-mail message to another computer in accordance with the reroute condition.

19. The computer-implemented method of claim 18, further comprising performing a post-processing function comprising sending the multi-recipient e-mail message in accordance with a retry interval, wherein the control information further comprises the retry interval.

20. The computer-implemented method of claim 15, wherein the same reason comprises a thread limit for each of the plurality of recipients has been exceeded.

* * * * *